Dec. 3, 1957 W. G. GLOVER 2,815,199
CUTTING MACHINES
Filed Aug. 23, 1956 2 Sheets-Sheet 1
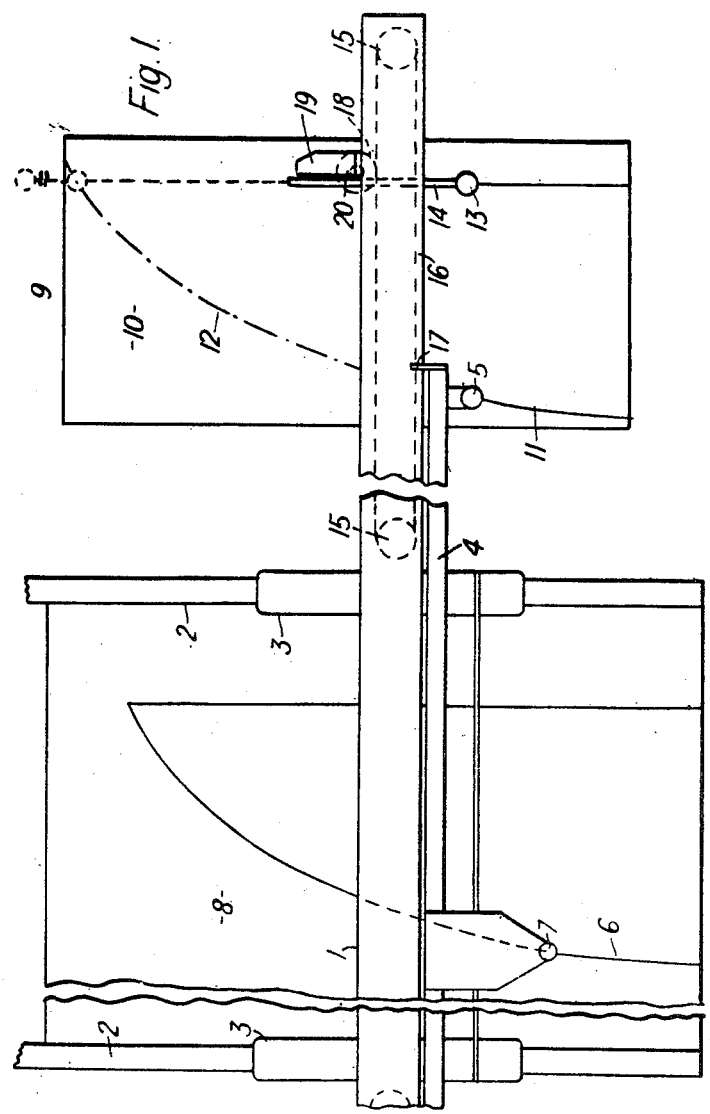
Inventor
WILLIAM GEORGE GLOVER
By Lee L. Townshend
Attorney

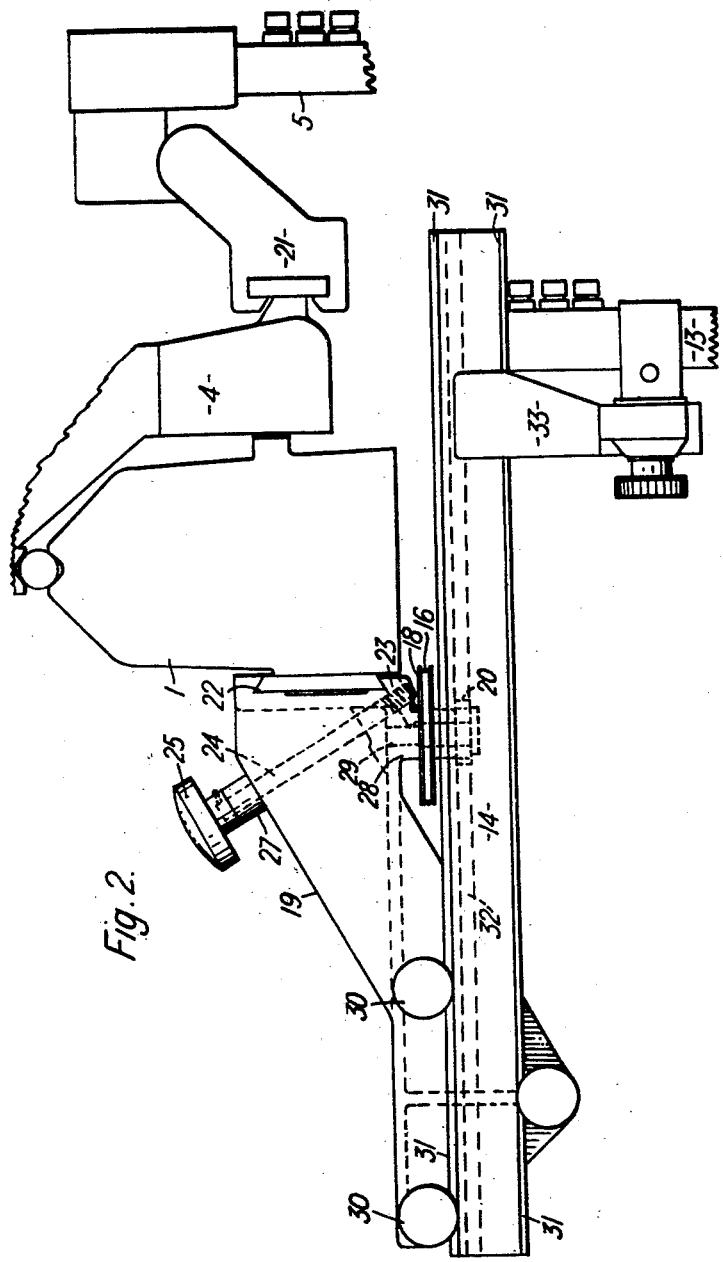

United States Patent Office 2,815,199
Patented Dec. 3, 1957

2,815,199
CUTTING MACHINES

William George Glover, London, England, assignor to The British Oxygen Company Limited, a British company Application August 23, 1956, Serial No. 605,810

Claims priority, application Great Britain August 31, 1955

3 Claims. (Cl. 266—23)

The present invention relates to machines for cutting along a path determined by a template of any suitable type and may be applied, for example, to gas flame cutting machines. Such machines may be used for example, for cutting steel plates and it may be desired to cut such plates along two convergent, divergent or intersecting lines, one of which is straight and parallel with the longitudinal axis of the machine. It is an object of this invention to provide an arrangement enabling cutting to be effected simultaneously along such lines.

An arrangement in accordance with the present invention is especially applicable to cutting apparatus of the type having a carriage movable on rails in the direction of the longitudinal axis of the machine, said carriage carrying a beam extending transversely of the rails and supporting a boom which is movable lengthwise of the beam. The boom is arranged to carry the first cutting head, the movement of the boom relatively to the beam and of the carriage relatively to the rails being controlled by a template and follower device, so that the first cutting head moves along a path determined by the template. The template can be of any suitable type, such for example as a template of magnetic material associated with a magnetised follower wheel which is driven by a motor. It will be appreciated that in such a machine the template can be designed to cause the first cutting head to move along any desired path comprising straight or curved lines with components of movement in both the longitudinal and transverse directions.

The present invention consists of mounting a second cutting head in the beam so that it can move only in a straight line in the longitudinal direction of movement of the carriage along the rails, i. e. in a linear path which is parallel to the longitudinal component of movement of the first cutting head, for cutting at the same time as the first cutting head is guided to cut a curve or other shape, the second cutting head being mounted for movement relative to the beam in said longitudinal direction and said relative longitudinal movement being derived from the transverse movement of the first cutting head along the beam.

One construction of cutting machine in accordance with the present invention will now be described by way of example with reference to the two figures of the accompanying drawings in which:

Figure 1 is a diagrammatic fragmentary plan view of the machine showing the central tracing zone and one of the two cutting zones, the other cutting zone and the parts associated therewith being similar to that shown but disposed to the opposite side of the tracing zone, and Figure 2 is a transverse section of the beam and the boom of the machine showing the supporting arrangements for the first and second cutting heads in one of the two cutting zones of the machine.

Referring now to Figure 1 of the drawings, the cutting machine is of the type in which a beam 1 extends transversely of a pair of parallel rails 2 and is carried by two carriages 3 each movable along its own rail 2. The beam 1 supports a boom 4 movable lengthwise of the beam and the boom 4 is arranged to carry towards each of its ends first cutting heads 5, only one of which is shown. The space between the rails 2 constitutes a tracing zone 8 in which a template 6 may be placed, and the spaces to each side of the tracing zone 8 constitute cutting zones 9, only one cutting zone being shown in the drawings.

A plate 10, for example, to be cut by the machine is disposed in the cutting zone 9, and a cut to be effected by the first cutting head 5 is determined by the template 6, a tracing head 7 carried by the boom 4 controlling movement of the boom 4 relatively to the beam 1 and of the carriages 3 relatively to the rails 2. The template 6 and tracing head 7 may be of any suitable type, such for example as a template of magnetic material associated with a magnetised follower wheel which is driven by a motor. It will be appreciated that the template can be designed to cause the first cutting head 5 to move along any desired path. A cut already made in the plate 10 is indicated at 11 and the path which the first cutting head 5 will follow under the control of the template 6 is indicated by chain line at 12.

A second cutting head 13 is carried by a slider 14 clamped to the beam 1 by a bracket member 19, this cutting head 13 partaking of the longitudinal movement of the beam 1 along the rails 2. The slider 14 is adjustable in position along the beam 1 but is normally clamped to the beam during a cutting operation so that the second cutting head 13 cuts a straight edge parallel to the rails 2 in the plate 10.

The slider 14, which is shown in more detail in Figure 2, is arranged to move relatively to the beam 1 in a direction parallel to the rails 2 in the longitudinal direction of movement of the carriages 3 in accordance with the movement of the first cutting head 5 along the beam 1.

The bracket member 19 carries a pulley 18 driving a pinion 20 which co-operates with a rack formed at one side of the slider 14, the pulley 18 being arranged to be driven by an endless chain or cable 16 passing around spaced jockey pulleys 15 on the beam 1. The endless chain or cable 16 is attached to the end of the boom 4 by a cable grip 17 so that movement of the boom 4 and hence the first cutting head 5 relatively to the beam 1 in the transverse direction will effect movement of the slider 14 and hence of the second cutting head 13 relatively to the beam 1 in the longitudinal direction of movement of the carriages 3. Thus the second cutting head 13 is arranged to be moved relatively to the beam 1 in a direction parallel to the rails 2 in dependence upon the transverse component of the movement of the first cutting head 5. By a suitable selection of the size of the driven pulley 18, according to the shape to be cut by the first cutting head 5 when moving along the profile, the speed of the second cutting head 13 can be made to remain appreciably more constant than if its speed of movement were determined as is normal practice solely by the speed of movement of the first cutting head 5 in the longitudinal direction. If desired, the pulley 18 may be stepped or other means may be provided to permit selection of a suitable relationship between the speed of movement of the first cutting head 5 along the beam 1 in the transverse direction and the increase of speed of the second cutting head 13 in the longitudinal direction due to its movement relative to the beam 1 derived from the transverse movement of the first cutting head.

Referring now to Figure 2 of the drawings, in which the supporting arrangement for the cutting heads is shown in greater detail, the beam 1 supports the boom 4 by means of a ball race so that the boom may be moved longitudinally of the beam. The first cutting head 5 is carried on the boom 4 by means of a support member 21 and carries one or more gas jets at its lower end (not shown) for directing a cutting flame or flames at a workpiece to be cut.

A guide 22 is screwed to the beam 1 at the opposite side to the boom 4, and to this guide is clamped bracket member 19, this clamping being effected by a nut 23 which engages behind the guide 22 and co-operates with a screw-threaded rod 24 arranged to be rotated by a knob 25 secured to the rod 24 by a grub screw 26. A bush 27 interposed between the knob 25 and the bracket member 19 limits movement of the rod 25 into the bracket member. Bracket member 19 is formed with a bearing 28 for a spindle 29, this spindle carrying pulley 18 and pinion 20. The bracket member extends away from the beam 1 and carries at its outer end two upper and one lower guide rollers 30 which are spaced to allow slider 14 to extend therebetween parallel to the direction of movement of the beam 1. The circumferential surfaces of the guide rollers 30 are of V-shape cross-section so that these rollers embrace the bevelled upper and lower edges 31 of the slider 14, and slider 14 is formed with a rack of teeth 32 with which the pinion 20 can co-operate. At one end a bracket 33 is secured to the slider 14, this bracket supporting second cutting head 13.

In operation of the cutting machine, when boom 4 carrying the first cutting head 5 moves along the beam 1 in the transverse direction the endless chain or cable 16 which passes around pulley 18 with cable grip 17 (see Figure 1) so as to rotate pulley 18, spindle 29 and pinion 20. Pinion 20 co-operating with the rack 32 drives slider 14 and thus moves the second cutting head 13 relatively to the beam 1 in the longitudinal direction.

The supporting arrangement just described is of course duplicated at the other end of the beam 1 and boom 4 for further first and second cutting heads working in the cutting zone not shown in Figure 1.

It will be appreciated that various other types of mechanism may be used to translate movement of the first cutting head at right-angles to the rails into additional movement of the second cutting head in a direction parallel to the rails. Thus for example two racks at right angles may co-operate with one pinion. If desired, the coupling may be effected in a manner which permits variation of the ratio of the speed of movement of the first cutting head at right-angles to the rails relatively to the alteration of speed of movement of the second cutting head in a direction parallel to the rails. Such variation may be effected, for example, by a cam or equivalent device. The mechanism may be arranged to cause the speed of movement of the second cutting head to be increased whenever the boom is moved along the beam regardless of the direction of such movement.

Furthermore, instead of the second cutting head being carried by a slider which is movable relatively to the beam this cutting head may be driven along a bar or the like which is normally fixed relative to the beam, the bar or the like being carried by the beam and extending parallel to the rails.

What I claim is:

1. A cutting machine comprising a first cutting head adapted to be moved in a predetermined path under the control of a template device, a second cutting head adapted to be moved in a linear path, means for resolving the motion of said first cutting head in two directions, one of which is parallel to the direction of linear movement of said second cutting head, and means for varying the speed of movement of said second cutting head in dependence upon the component of movement of said first cutting head its other direction of resolution.

2. In a cutting machine of the kind provided with carriage means which supports a transverse beam for movement in the direction of the longitudinal axis of the machine, said beam supporting a cutting head for movement along the beam whereby the head has components of movement in both the longitudinal and transverse directions, the combination of a second cutting head, guide means mounting said second head on the beam for movement of the head relative to the beam in the longitudinal direction, and a motion transmission mechanism interconnecting the two heads for effecting said longitudinal movement of the second head in dependence on movement of the first head in the transverse direction.

3. In a cutting machine of the kind provided with carriage means which supports a transverse beam for movement in the direction of the longitudinal axis of the machine, said beam supporting a cutting head for movement along the beam whereby the head has components of movement in both the longitudinal and transverse directions, the combination of a boom, means mounting said boom for movement along the beam, a first cutting head secured to the boom for movement therewith along the beam, a slider, guide means mounting said slider on the beam for movement relative to the beam in the longitudinal direction of movement of the beam and the carriage means, an endless cable, guide pulleys mounting said cable on the beam, a drive pulley journalled on the beam for rotation by said endless cable, a pinion drivably connected to the drive pulley and in mesh with a toothed rack on the slider, and an operative connection between the boom and said endless cable, whereby movement of the boom in the transverse direction effects movement of the endless cable to rotate the drive pulley and pinion and thereby move the slider and second cutting head relative to the beam in the longitudinal direction.

References Cited in the file of this patent

UNITED STATES PATENTS

| | | |
|---|---|---|
| 2,336,626 | Mott et al. | Dec. 14, 1943 |
| 2,477,041 | Bucknam et al. | July 26, 1949 |
| 2,494,663 | Lobosco | Jan. 17, 1950 |
| 2,564,364 | Kane | Aug. 14, 1951 |
| 2,571,248 | Hutt | Oct. 16, 1951 |